UNITED STATES PATENT OFFICE.

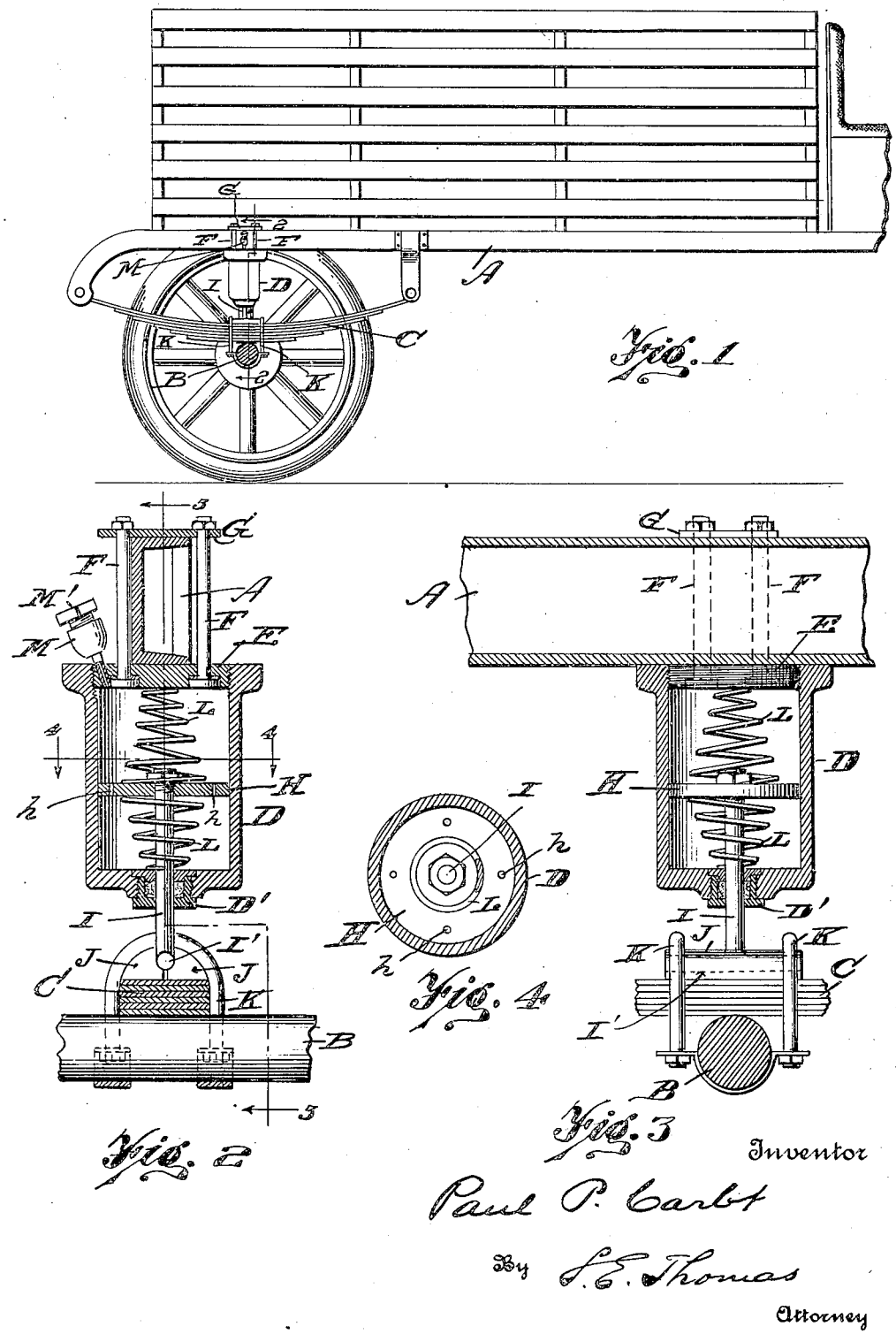

PAUL P. CARBT, OF DETROIT, MICHIGAN.

SHOCK-ABSORBER FOR VEHICLES.

1,319,848.  Specification of Letters Patent.  Patented Oct. 28, 1919.

Application filed May 7, 1919. Serial No. 295,391.

*To all whom it may concern:*

Be it known that I, PAUL P. CARBT, citizen of the United States, residing at Detroit, county of Wayne, State of Michigan, have invented a certain new and useful Improvement in Shock-Absorbers for Vehicles, and declare the following to be a full, clear, and exact description of the same, such as will enable others skilled in the art to which it pertains to make and use the same, reference being had to the accompanying drawings, which form a part of this specification.

My invention relates to shock absorbers for motor driven vehicles, shown in the accompanying drawings and more particularly described in the following specification and claims.

One object of my invention is to provide an inexpensive but effective shock absorber which may be employed in connection with any motor driven vehicle but which is particularly designed for vehicles employing a longitudinal spring suspension.

Another feature of the invention is its simplicity, being constructed of relatively few parts which are easily assembled,—not liable to get out of order, and which may be readily replaced at small cost in the event of an accident.

Another feature of the invention is its noiseless operation, the device consisting of a closed dash-pot or cylinder bolted to the frame of the vehicle and charged with oil or other suitable fluid,—which upon being forced through a perforated piston connected with the spring suspension, serves to check and bring under control the oscillation of the vehicle.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a fragmentary side elevation of a motor vehicle, showing the device mounted over the axle.

Fig. 2 is a vertical cross-sectional view through the device, the supporting frame, spring suspension and axle, taken on line 2—2 of Fig. 1.

Fig. 3 is another vertical cross-section view taken on line 3—3 of Fig. 2.

Fig. 4 is a horizontal sectional view on line 4—4 of Fig. 2.

Referring now to the letters of reference placed upon the drawings:—

A, denotes the frame of a motor driven vehicle.

B, indicates an axle, to which is bolted a spring C, with its ends connected in the usual manner to the vehicle frame.

D, is a dash-pot or cylinder threaded at its upper end to receive a closure cap E, perforated for the passage of bolts F, F, extending through a plate G, overlapping the vehicle frame.

H, is a piston fitted in the dash-pot D, provided with a plurality of apertures $h$, for the passage of oil or other fluid from one side of the piston to the other.

I, indicates a stem projecting from the piston H, through a suitable stuffing box D', at the end of the dash-pot.

The end of the stem I, is provided with a cross-arm I'. J, J, denote a pair of plates formed with opposing semi-circular recesses to receive the cross-arm I', mounted upon the spring C, and secured thereto by a pair of clip bolts K, which also serve to secure the spring to the axle.

Housed within the dash-pot are a pair of coiled springs L, respectively bearing against the ends of the latter and against the opposite sides of the piston H, to maintain the piston normally equidistant from the ends of the dash-pot.

M, denotes an oil cup opening into the chamber of the dash-pot through which oil of suitable consistency may be delivered into said chamber. M', is a closure cap by adjusting which the oil may be discharged from the cup.

Having now indicated the several parts by reference letters, the construction and operation of the device will be readily understood.

The chamber of the dash-pot on each side of the perforated piston is charged with oil or other fluid of suitable viscosity.

The oscillation of the vehicle due to traveling over rough or rugged roads will cause the piston to reciprocate through its connection with the spring suspension,—the movement of the piston however will be retarded by the passage of the oil through the restricted openings in the latter, thereby checking the oscillation of the vehicle and thus bringing it under control.

To provide for any lateral movement of the vehicle frame with reference to the running gear, the stem of the piston is fitted with a cross arm I', adapted to flex in its connection with the spring suspension—thereby relieving it of any strain from this cause.

Having thus described my invention what I claim is:—

1. In a device of the character described, a cup-shaped cylinder threaded to receive a closure cap, a closure cap, bolts extending through the closure cap for securing the cylinder to the frame of a vehicle, a perforated piston having a rod projecting through the end of the cylinder and connected with the spring suspension of the vehicle, and means for maintaining the piston in a substantially equi-distant relation to the ends of the cylinder.

2. In a device of the character described, a cup-shaped cylinder, a closure cap for the cylinder, means for suspending the cylinder from the frame of a vehicle, means for charging said cylinder with oil, a piston perforated for the passage of oil therethrough, a rod projecting from said piston having a cross-arm at its outer end, means secured to the spring of the vehicle in which the cross-arm of the piston rod is journaled, and springs for returning the piston to a neutral position.

In testimony whereof I sign this specification in the presence of two witnesses.

PAUL P. CARBT.

Witnesses:
   S. E. THOMAS,
   JOHN CONSIDINE, Jr.